March 22, 1955     D. R. BLAKE     2,704,663
LEVELING DEVICE
Filed July 24, 1948
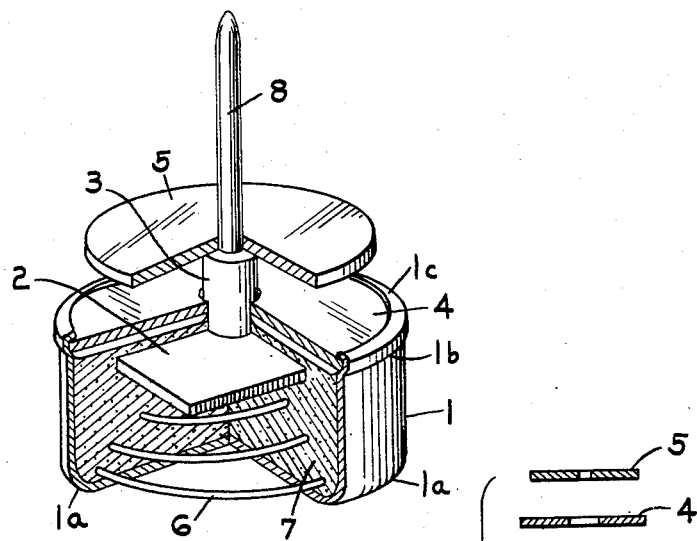
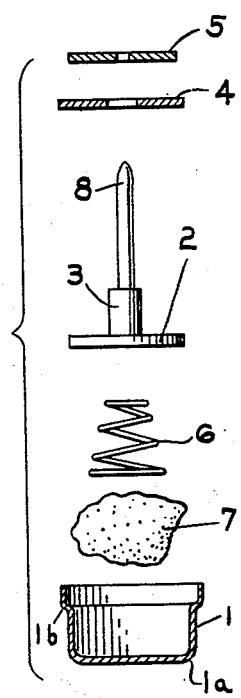
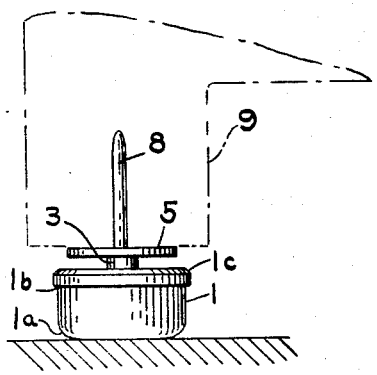
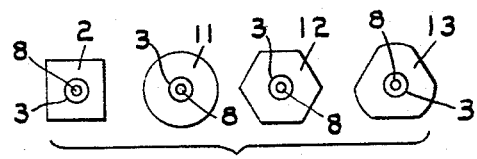
INVENTOR.
DAVID R. BLAKE
BY
ATTORNEY

United States Patent Office 2,704,663
Patented Mar. 22, 1955

2,704,663

LEVELING DEVICE

David R. Blake, Detroit, Mich.

Application July 24, 1948, Serial No. 40,589

2 Claims. (Cl. 267—1)

This invention relates to leveling devices for furniture and the like, and its chief object is to provide simple automatic devices for preventing tables, cabinets, refrigerators and other articles and machines from rocking when they are resting on an uneven floor.

One of the principal features of this invention is the simplicity of the devices. The essential elements of each device consist merely of a dashpot with a piston and a spring to extend it, some means like a screw or a nail for fixing the piston to the end of a table leg or other support, and a filling of a peculiar substance called "bouncing putty" to keep the dashpot from compressing quickly under a load.

Bouncing putty has a unique combination of the properties of a liquid and a solid. One the one hand, it will deform slowly under the slightest force, like a very viscous liquid, and there is no limit to how far it will deform, as long as the force applied to it is not great enough and applied suddenly enough to break it. A lump of it placed in a container will spread out under merely its own weight and in a few hours cover the bottom of the container like a liquid. On the other hand, it will not flow quickly; it resists sudden forces as if it were a solid. Its rigidity under sudden forces is like that of rubber rather than like that of steel, and a round lump of it will bounce like a rubber ball.

The other property of bouncing putty that makes this simple device quite practical is its power of self-adhesion or its strong tendency to stick together, like a liquid with a high surface tension. While it does wet and stick to metals, like water, it does not wet them so strongly as to creep over their surface, like oil. In other words, bouncing putty sticks to itself more strongly than it sticks to other things; in scientific language, its coherence is greater than its adherence.

Because bouncing putty has these properties, the dashpot can be made very simply with large clearances and with no check valves, piston rings, packing glands, flexible diaphragms, bellows, or other seals to keep the filling from flowing past the piston too fast or from leaking out.

The invention is perhaps best illustrated by its commercial form, shown in the drawings, in which:

Fig. 1 is a perspective view of the device, partly in section;

Fig. 2 is a side view on a smaller scale showing the device in use;

Fig. 3 is an exploded view showing the separate parts of the device; and

Fig. 4 shows, in plan, various shapes of pistons that may be used in the device.

This form of the invention, which is called a "leveler," is made up of a metal cup or cylinder 1 closed at the bottom, a piston 2 and a piston rod 3 working in the cylinder, an upper head or cover 4 on the cylinder through which the piston rod passes, a stop plate 5 fixed to the upper end of the piston rod, a coil spring 6 between the bottom of the cylinder and the piston, a filling 7 of bouncing putty in the cylinder, and a nail 8 or screw on the end of the piston rod above the stop plate for fastening the leveler to the leg 9 of a piece of furniture.

The cup or cylinder may be pressed from sheet metal with the bottom and sides in one piece, and the edge 1–a where the bottom joins the side is rounded to make it easier to slide the furniture on the floor. The upper part of the side is jogged out to form a shoulder 1–b on which the cover 4 rests, and the cover is held in place by having the extreme upper edge or rim 1–c of the side bent over onto it.

The cylinder head or cover 4 is a flat disc of metal with a hole in its center to let the piston rod pass through, and it may be made of hardened steel so that it will not become bent when it is being fastened to the cylinder.

The piston and the piston rod may be in one piece turned from a solid bar. This bar may be round and it should be a little smaller in diameter than the inside of the cylinder. The piston will then be round, as shown at 11 in Fig. 4, and there will be a small clearance between the piston and cylinder to provide a passage for the bouncing putty to flow through from one side of the piston to the other. Perhaps better than this, however, is to make the piston from a bar that is not round. Depending on the shape of the bar, the piston will then be square, hexagonal, or round with three or more notches or flat places, as shown at 2, 12 and 13 in Fig. 4, and dimensioned so that its corners will touch the sides of the cylinder and guide the piston while the spaces between the corners will let the bouncing putty flow past the piston. There is an advantage in not having either the piston or piston rod fit the cylinder closely; a large clearance lets the cup 1 tilt so as to sit squarely on an uneven floor.

The nail 8 on the end of the piston rod may be a headless nail with its blunt end pressed into a hole in the end of the piston rod. The stop plate 5 is a flat disc pressed onto the nail, and its underside bears on the upper end of the piston rod.

The spring 6 is a spiral compression spring. It is like an ordinary helical spring, but each of its coils is enough smaller than the coil below it so that one coil can fit inside of the next. This lets the entire spring to be pressed flat into the thickness of one coil, and the piston can move down further than if the coils piled upon top of each other. The strength of the spring required for satisfactory operation of the device is not a critical factor, since its function is primarily to overcome friction and insure relative movement between the working parts of the device. For best results, the weight of the article to which devices are applied should exceed the total load required to fully compress the springs of any two devices.

The space in the cylinder that is not taken up by the piston, piston rod and spring is filled or almost filled with bouncing putty 7. Chemically, bouncing putty is the solid elastic product of a reaction between a silicone oil and a compound of boron, such as, for example, boric acid, with the addition of a filler, such as lithopone.

When, for example, a table is placed on an uneven floor with levelers like those described above on all of its legs, most of the weight of the table will come onto diagonally opposite levelers, one of the other two will rest lightly on the floor and the fourth leveler will not touch at first. Then, as the tabe stands with most of its weight on two levelers, the pistons in those levelers will sink down slowly through the bouncing putty until the fourth leveler touches the floor. Then, all four levelers will rest on the floor, and the table will not rock. In most cases, the weight of the table will be more than enough to completely compress the springs in two levers, and the table will continue to settle slowly until the pistons in the two levers bottom and the springs in them are pressed flat. The pistons in the other two levelers will be part way down and the springs in them partly compressed, so all four levelers will be pressing on the floor and will keep the table from rocking. The example just described is one in which the weight of the table acts near its center. If this weight is far to one side, it will make the piston in the third leveler sink to the bottom, but the fourth leveler will still touch the floor and prevent rocking.

The invention has been described above in the best form in which it has been made to date, but it is obvious that changes and perhaps even improvements can be made while still keeping the invention described. For example, the spring might be put between the cylinder head and the stop plate, or the piston rod and nail might be made in one piece riveted to the piston. Also, it may be that other substances exist or may be discovered that have some or enough of the properties of the particular bouncing putty described to be used in its place. I, therefore, claim as my invention any device which comes within the terms of any of the following claims.

I claim:

1. A self-adjusting, variable-space-occupying device of maximum and of minimum over-all length and adapted for interposition between two opposed members, comprising in combination an impervious cup-shaped body engageable with one of the opposed members, an apertured cover plate secured across the body to form a chamber of finite volume, a transversely-disposed piston in the chamber which divides the chamber into two subchambers and has a configuration which permits the flow of a fluid in either direction from one subchamber to the other and with the same facility whereby the piston may be variably placed in the chamber, a piston rod extending through said aperture in the cover plate in leakproof relation therewith and engageable with the other opposed member, a compression spring between the piston and the cup-shaped body tending to extend the device to the maximum over-all length thereof, and a filling in the form of a mass of bouncing putty occupying the entire volume of the chamber not occupied by the piston, the spring and the rod, so that piston movement toward or from the cover plate requires flow of the filling in the opposite direction, said bouncing putty being flowable past the piston when subject to forces of the magnitude to compress the spring or those available from the spring when relieved of compression.

2. A variable space take-up device responsive to external compressive forces to be shortened to a minimum length and self-protracted toward its maximum length and comprising a closed chamber, a chamber-contained piston of smaller dimension than the chamber wall and provided with a piston rod protruding from one end of the chamber by which the piston can be pressed toward the other end of the chamber, an expansion spring between the piston and the said other end of the chamber, and a filling occupying the entire space of the closed chamber except that occupied by the piston, piston rod and spring and comprising a mass of bouncing putty which flows past the piston in accordance with the differences between the piston rod pressure and the spring pressure, the filling being compressed between whichever end of the chamber towards which the piston moves and the adjacent face of the piston to compel such flow.

References Cited in the file of this patent

UNITED STATES PATENTS

| 1,461,091 | Henley | July 10, 1923 |
| 2,431,878 | McGregor et al. | Dec. 2, 1947 |
| 2,460,116 | Bazley | Jan. 25, 1949 |

FOREIGN PATENTS

| 640,708 | Germany | Jan. 11, 1937 |